United States Patent
Guey et al.

(10) Patent No.: US 10,887,926 B2
(45) Date of Patent: Jan. 5, 2021

(54) CONFIGURATION OF NON-ORTHOGONAL MULTIPLE ACCESS TRANSMISSIONS IN A WIRELESS COMMUNICATION SYSTEM

(71) Applicant: Mediatek Inc., Hsin-Chu (TW)

(72) Inventors: Jiann-Ching Guey, Hsinchu (TW); Chun-Hsuan Kuo, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 96 days.

(21) Appl. No.: 16/169,169

(22) Filed: Oct. 24, 2018

(65) Prior Publication Data
US 2019/0132870 A1    May 2, 2019

Related U.S. Application Data

(60) Provisional application No. 62/577,220, filed on Oct. 26, 2017.

(51) Int. Cl.
*H04W 74/08*      (2009.01)
*H04W 16/14*     (2009.01)
*H04W 28/06*     (2009.01)
*H04W 4/06*       (2009.01)

(52) U.S. Cl.
CPC ......... *H04W 74/085* (2013.01); *H04W 16/14* (2013.01); *H04W 28/06* (2013.01); *H04W 74/08* (2013.01); *H04W 4/06* (2013.01)

(58) Field of Classification Search
CPC ........... H04W 74/083; H04W 72/0466; H04W 72/042; H04W 74/006; H04W 74/0833; H04W 74/085; H04W 74/08; H04W 16/14; H04W 28/06; H04W 4/06; H04L 1/0071; H04L 1/0041; H04B 7/0456; H04B 7/0639; H04J 11/0023
See application file for complete search history.

(56) References Cited

U.S. PATENT DOCUMENTS

| 2008/0273610 A1* | 11/2008 | Malladi ................. H04L 1/0032 375/260 |
| 2009/0175248 A1 | 7/2009 | Kim et al. |
| 2010/0195619 A1* | 8/2010 | Bonneville ......... H04W 52/244 370/331 |
| 2012/0250659 A1 | 10/2012 | Sambhwani |
| 2017/0150523 A1* | 5/2017 | Patel ..................... H04L 5/0048 |
| 2018/0234863 A1* | 8/2018 | Li .......................... H04L 1/0009 |
| 2019/0320467 A1* | 10/2019 | Freda .................... H04L 5/0055 |

FOREIGN PATENT DOCUMENTS

| CN | 1838574 A | 9/2006 |
| CN | 102469558 A | 5/2012 |
| CN | 103368717 A | 10/2013 |

OTHER PUBLICATIONS

International Search Report of PCT/CN2018/112073, dated Jan. 25, 2019.

* cited by examiner

*Primary Examiner* — Elton Williams
(74) *Attorney, Agent, or Firm* — Locke Lord LLP; Tim Tingkang Xia, Esq.

(57) ABSTRACT

In an aspect of the disclosure, a method, a computer-readable medium, and UE are provided. The UE receive a configuration from a base station, the configuration indicating one or more constraints for constructing and transmitting a multiple-access signature. The UE then constructs the multiple-access signature in accordance with the one or more constraints. The UE autonomously transmits the multiple-access signature to the base station in accordance with the one or more constraints.

20 Claims, 16 Drawing Sheets

812

| Odd Numbered Frames | | |
|---|---|---|
| Path Gain | MCS | TX Power | λ |
| < 3dB | 1 | 23 dBm | 1 |
| 3 to 10 dB | 2 | 20 dBm | 0.5 |
| > 10 db | 3 | 17 dBm | 0 |

814

| Even Numbered Frames | | |
|---|---|---|
| Path Gain | MCS | TX Power | λ |
| < 3dB | 1 | 23 dBm | 0 |
| 3 to 10 dB | 2 | 20 dBm | 0.5 |
| > 10 db | 3 | 17 dBm | 1 |

FIG. 8

| Doppler Spread / Delay Spread | Low | Medium | High |
|---|---|---|---|
| Low | 0 to 15 | 16 to 31 | Do not transmit |
| Medium | 32 to 47 | 48 to 63 | Do not transmit |
| High | Do not transmit | Do not transmit | Do not transmit |

FIG. 9

| Preamble | DMRS | Scrambler / Interleaver | MCS Level | TX Power |
|---|---|---|---|---|
| 1 | 0 | 1 | 3 | 1 |
| 13 | 2 | 2 | 3 | 1 |
| 25 | 4 | 3 | 4 | 1 |
| 38 | 6 | 4 | 2 | 1 |
| 73 | 8 | 5 | 3 | 1 |
| Others | Do Not Transmit | | | |

FIG. 11

CONFIGURATION OF NON-ORTHOGONAL MULTIPLE ACCESS TRANSMISSIONS IN A WIRELESS COMMUNICATION SYSTEM

CROSS-REFERENCE TO RELATED APPLICATION(S)

This application claims the benefit of U.S. Provisional Application Ser. No. 62/577,220, entitled "CONFIGURATION OF NON-ORTHOGONAL MULTIPLE ACCESS TRANSMISSIONS IN A WIRELESS COMMUNICATION SYSTEM" and filed on Oct. 26, 2017, which is expressly incorporated by reference herein in its entirety.

BACKGROUND

Field

The present disclosure relates generally to communication systems, and more particularly, to techniques of constructing and transmitting multiple-access signatures.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and user equipment (UE) are provided. The UE receive a configuration from a base station, the configuration indicating one or more constraints for constructing and transmitting a multiple-access signature. The UE then constructs the multiple-access signature in accordance with the one or more constraints. The UE autonomously transmits the multiple-access signature to the base station in accordance with the one or more constraints.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating constraints on construction and transmission of multiple-access signatures.

FIG. 9 is a diagram illustrating constraints on construction and transmission of multiple-access signatures.

FIG. 11 is a diagram illustrating constraints on construction and transmission of multiple-access signatures.

DETAILED DESCRIPTION

Figure 1:
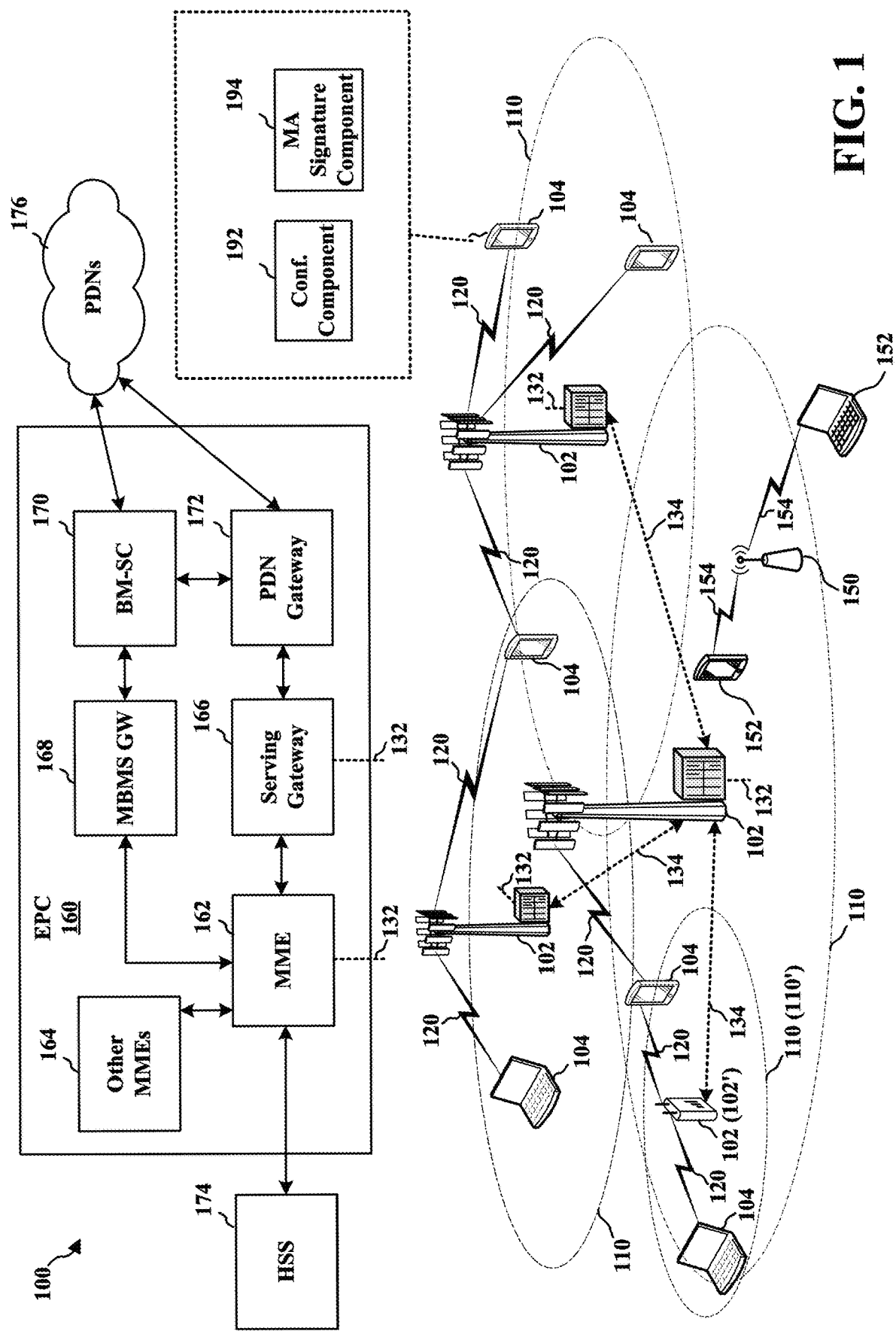
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a configuration component 192 and a multiple-access signature component 194. The configuration component 192 receives a configuration from a base station, the configuration indicating one or more constraints for constructing and transmitting a multiple-access signature. The multiple-access signature component 194 then constructs the multiple-access signature in accordance with the one or more constraints. The UE autonomously transmits the multiple-access signature to the base station in accordance with the one or more constraints.

Figure 2:
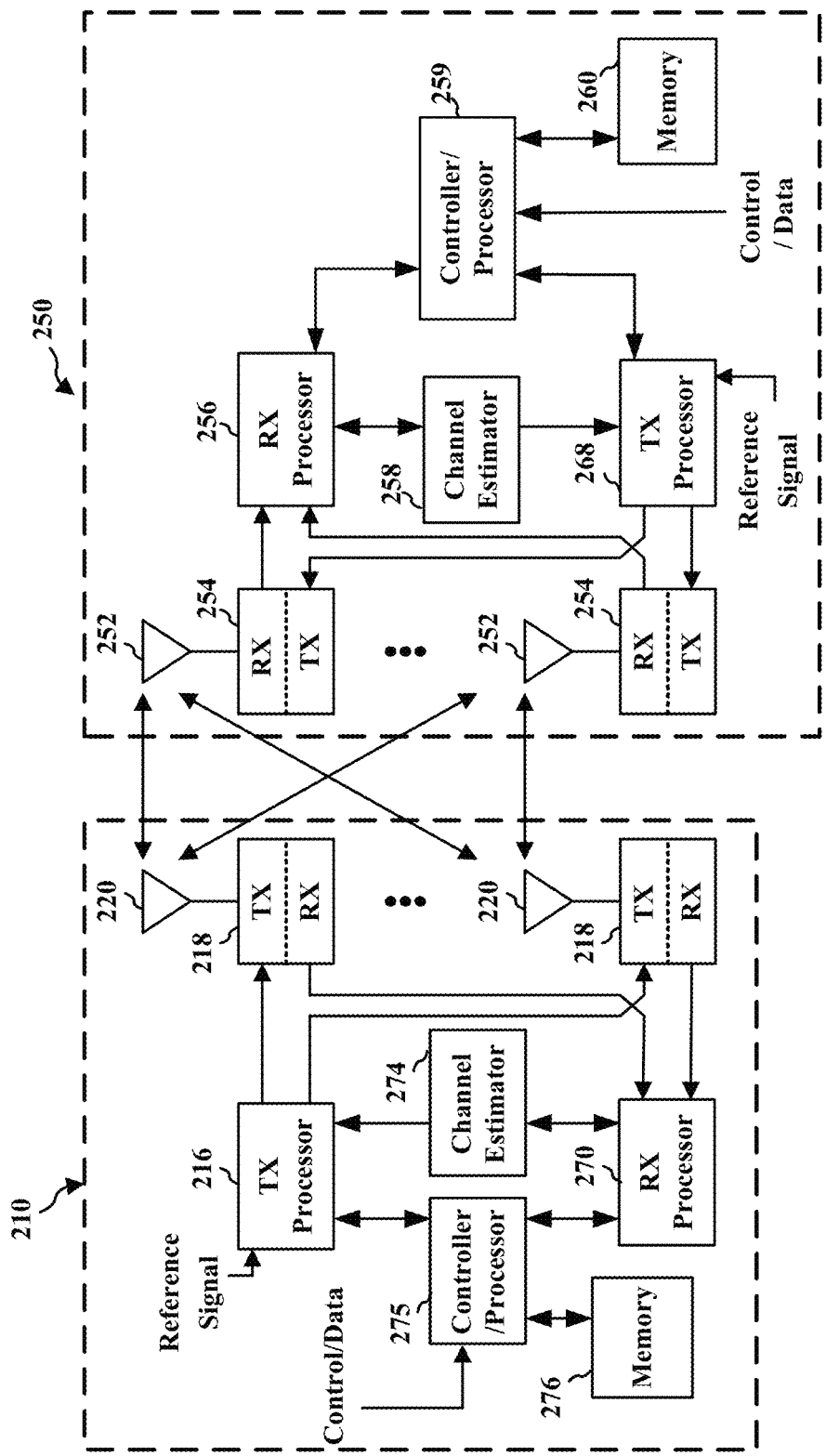
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
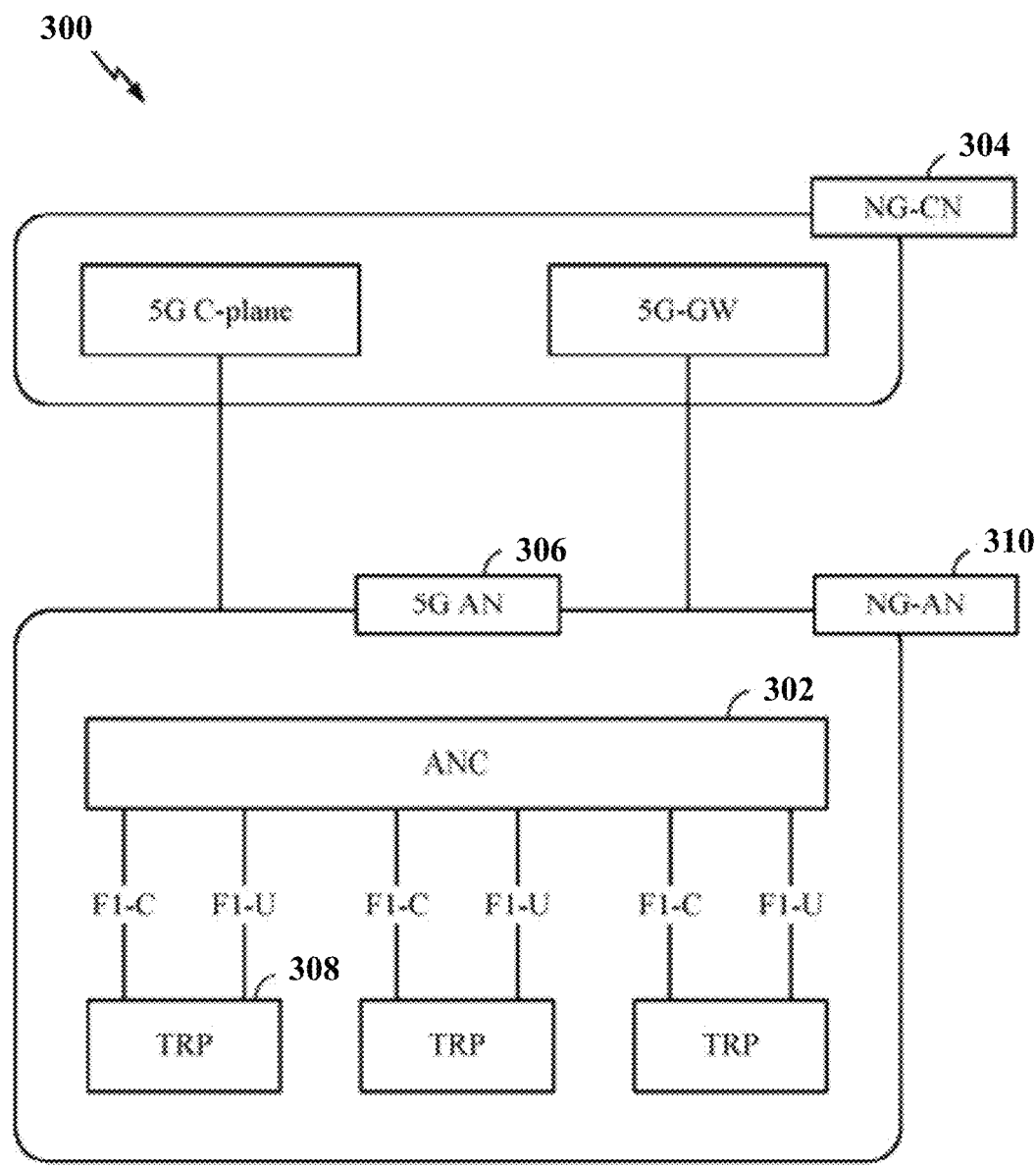
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
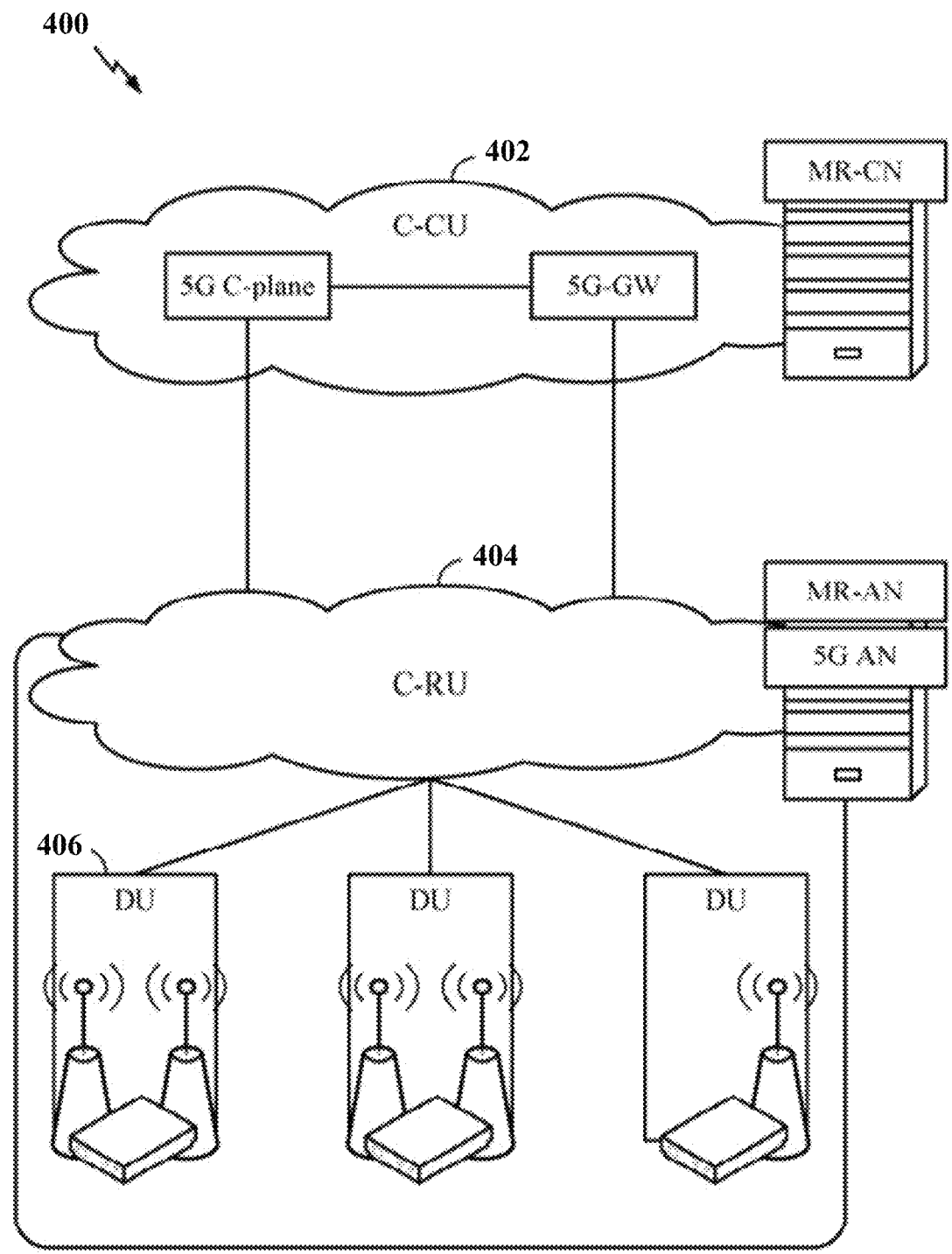
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
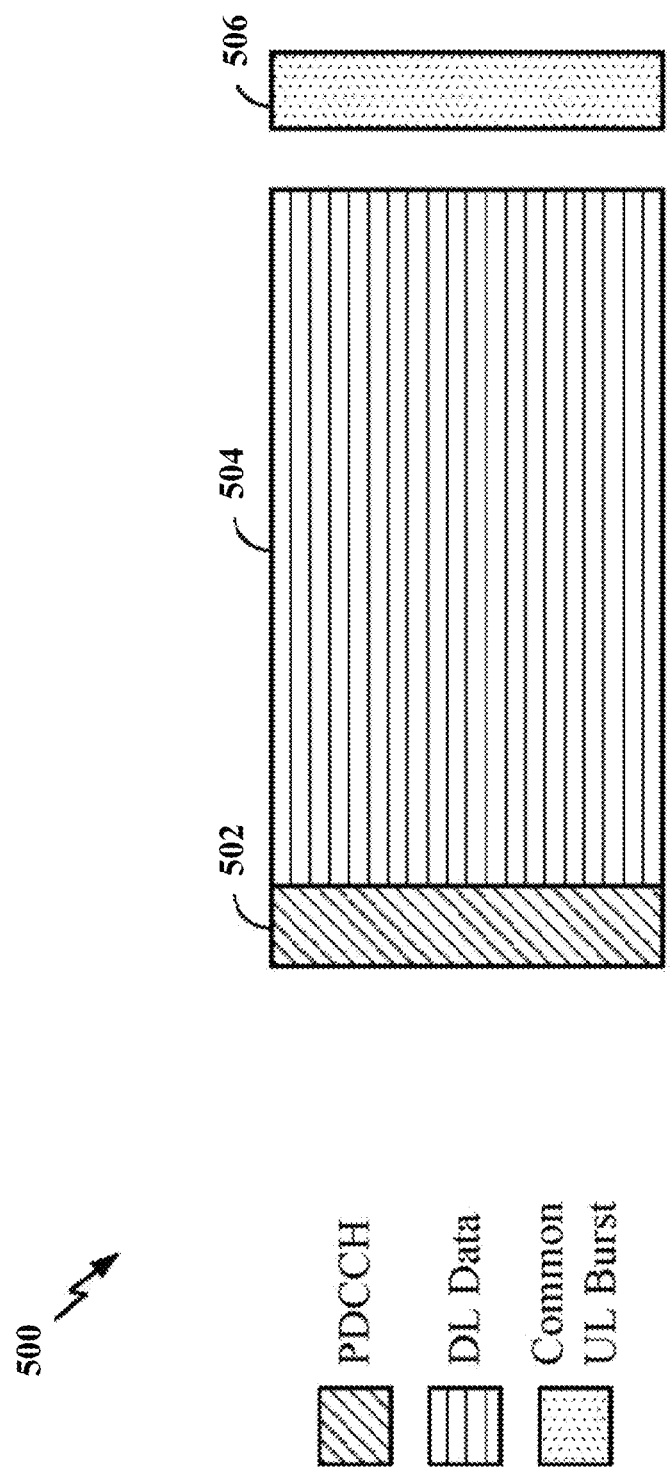
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
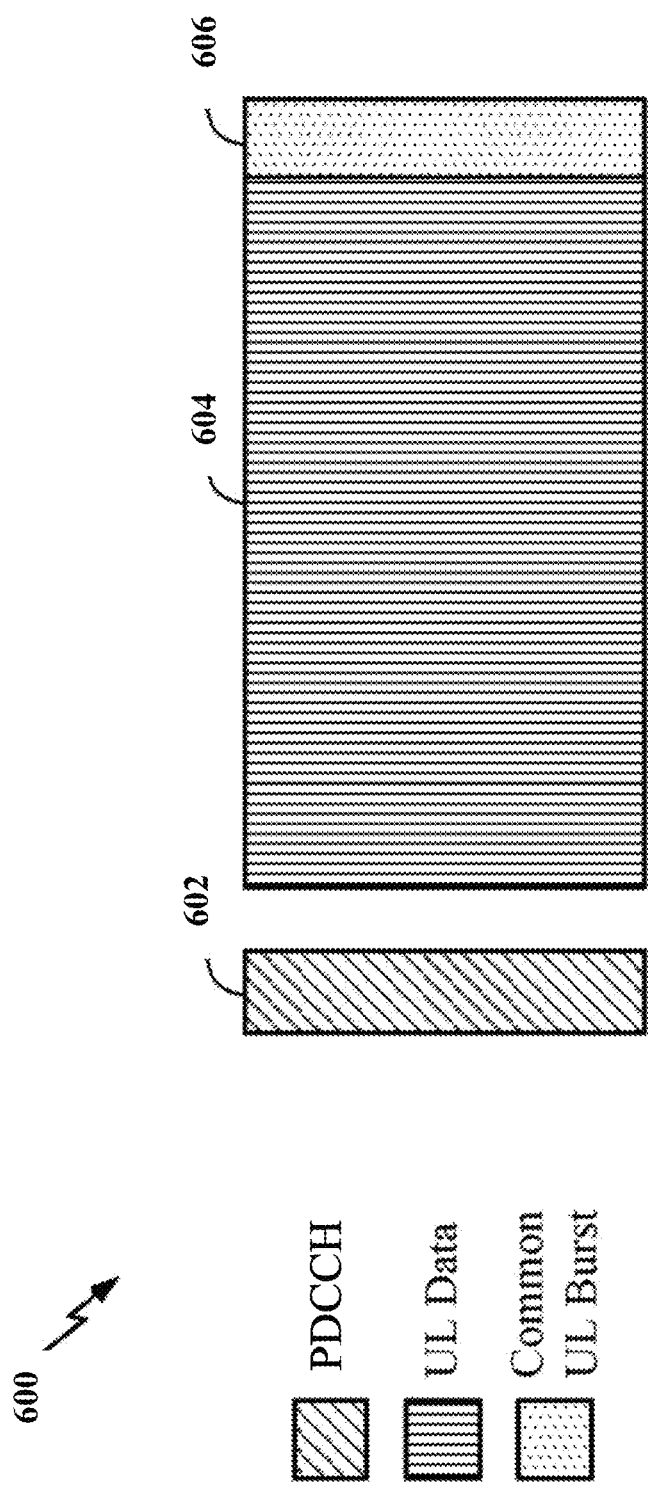
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The present disclosure is directed to techniques employed by multiple devices to transmit data to a single receiving device on a Multiple Access Channel. In particular, the data transmissions of the multiple devices may be autonomous. In other words, the data transmissions of the multiple devices are not scheduled by a management entity. Rather, the multiple device themselves decide, under certain constraints, the time and frequency for transmitting the data. The present disclosure use uplink (UL) transmissions from multiple User Equipment (UEs) to a single Base Station (BS) as examples for discussion. The techniques described here can be applied to any multiple access channel in which multiple devices are transmitting to a single receiving device, or, to a network of receiving devices having a single radio controller.

Figure 7:
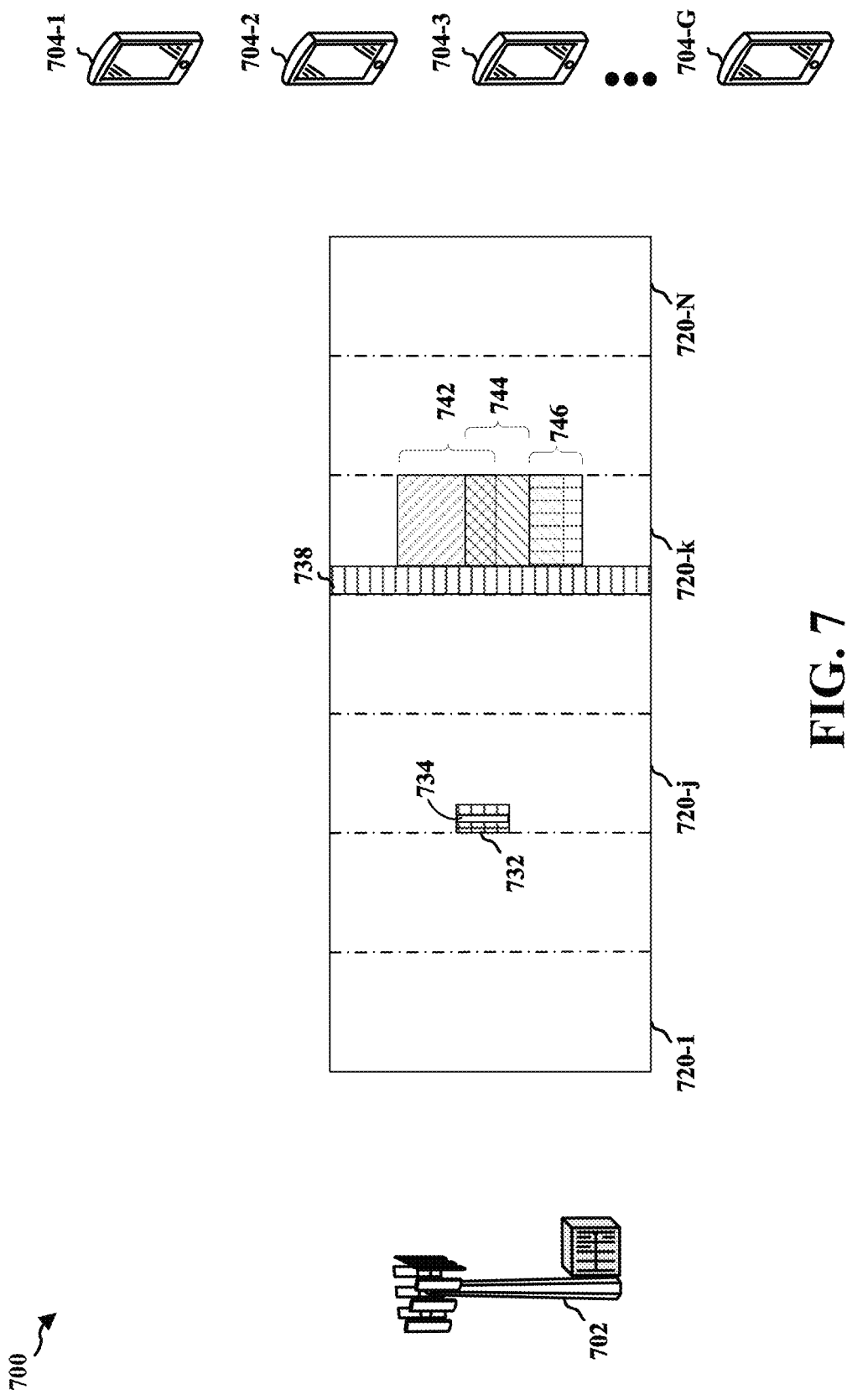
FIG. 7 is a diagram illustrating communications between a base station and multiple UEs.

FIG. 7 is a diagram 700 illustrating communications between a base station 702 and a UEs 704-1, 704-2, . . . 704-G. The base station 702 transmits signals in slots 720-1 . . . 720-N of a single frame. Further, the base station 702 periodically transmits synchronization signal blocks (SSBs) that includes synchronization information and other information for accessing the base station 702. In particular, an SSB includes a PBCH in which system information is broadcast. In this example, the base station 702 transmits an SSB 732 including a PBCH 734 in a slot 720-j. The UEs 704-1, 704-2, . . . 704-G detects the SSB 732 or other SSBs. Based on the information in the SSBs, the base station 702 obtains knowledge of the slot structure of the slots 720-1 . . . 720-N.

The UEs 704-1, 704-2, . . . 704-G each can transmit UL data to the base station 702 autonomously without being scheduled by the base station 702. Autonomous transmission by the UEs may reduce overhead and latency for UL multiple access. On the other hand, because autonomous transmissions from the UEs 704-1, 704-2, . . . 704-G are not coordinated by the base station 702 through the scheduler, interference/collision may occur. Multiple access schemes with multi-user interference/collision is often referred to as Non-orthogonal Multiple Access (NoMA) due to the non-orthogonality among the signals transmitted by the multiple UEs. The interference/collision may be the unintentional consequence of the autonomous transmissions. The interference/collision may also be intentionally generated by the scheduler to maximize spectral efficiency. There is a need for a mechanism that can reduce unintentional interference/collisions resulting from autonomous transmission.

A UE may autonomously transmit a multiple-access signature to a base station. A multiple-access signature includes one or more of the following: a preamble (or other an identification signature signal) that can identify the multiple-access signature, a modulated symbols part containing modulated symbols carrying data bits, Demodulation Reference Signals (DMRSs) for demodulating the modulated symbols, time and frequency resources used to carry the modulated symbols, a particular interleaver employed to interleave the data bits, a particular scrambler employed to scramble the data bits, a particular Modulation and Coding Scheme (MCS) according to which the data bits are encoded and modulated to generate the modulated symbols, and the transmit power for transmitting the modulated symbols at the time and frequency resources.

In this example, based on the information from the SSB 732, the UEs 704-1, 704-2, . . . 704-G can determine that the slot 720-k is an UL slot with a PDCCH 738. Further, the UEs 704-1, 704-2, 704-3 transmits multiple-access signatures 742, 744, 746 to the base station 702 in the slot 720-k after the PDCCH 738. As shown, the multiple-access signatures 742, 744, 746 may overlap with each other in time and frequency domains.

In certain configurations, the multiple-access signatures 742, 744, 746 may be pre-assigned to the UEs 704-1, 704-2, 704-3, respectively. The UEs 704-1, 704-2, 704-3 transmit the pre-assigned multiple-access signatures 742, 744, 746 autonomously. In these configurations, the base station 702 and the UEs 704-1, 704-2, 704-3 may need to use additional signaling to assign the multiple-access signatures.

In certain configurations, the UEs 704-1, 704-2, 704-3 randomly selects the multiple-access signatures 742, 744, 746, respectively from a large pool of multiple-access signatures. In these configurations, randomly selected multiple-access signatures and transmission may generate great amount of multi-user interference, especially for DMRS. Non-orthogonal DMRS among different UEs lead to inaccurate channel estimation, which is critical to advanced multi-user demodulation and decoding. Further, too many UEs may try to transmit at the same time. The base station may not be able to decode correctly if code rates are not set properly.

The present disclosure introduces additional procedures performed at a UE in accordance with certain constraints and/or assignments from the base station before the UE transmits a multiple-access signature. Therefore, the transmission of a multiple-access signature from the UE is not completely autonomous. Such additional procedures performed at a UE are implemented to consume less resources and to involve fewer steps than traditional scheduling-based multiple access procedures.

The additional procedures at the UE, based on the constraints and assignments received from the base station, configure a more limited MA signatures pool from which the UE is allowed to select a multiple-access signature. Such procedures may result in less interferences among the multiple UE transmissions and increased system throughput.

FIG. 8 is a diagram 800 illustrating constraints on construction and transmission of multiple-access signatures. In a first technique, the base station 702 transmits configurations indicating constraints for selecting multiple-access signatures to the UEs 704-1, 704-2, . . . 704-G semi-statically. When the configuration includes constraints on UE behaviors that are slowly-changing, the base station 702 can communicate the configurations via broadcast channel (e.g., PBCH), by System Information Block (SIB), by Remaining System Information (NR RMSI), or by RRC signaling. In this example, the base station 702 transmits a configuration 812 and a configuration 814 in the PBCH 734 in the slot 720-k.

The configuration 812 indicates constraints for multiple-access signatures to be transmitted in odd numbered slots of the slots 720-1 . . . 720-N. The constraint includes transmission parameters and resource allocations. The transmission parameters include MCS, transmission power, etc. The resource allocations are derived from an activation factor $\lambda$. More specifically, a UE randomly generated number between 0 and 1, inclusive, and compares the number with $\lambda$. When the number is greater than $\lambda$, the UE may transmit a multiple-access signature in an odd numbered slot in the frame. Otherwise, the UE needs to wait till the next frame and repeat the process.

The configuration 812 may assign different transmission parameters and $\lambda$ to different channel profiles. For example, each channel profile may be associated with an MCS, a transmission power, and a value of $\lambda$. A channel profile may include various measurements at a UE, such as path gain, signal-to-noise ratio, etc. In this example, when the path gain is less than 3 dB at a UE, the MCS is 1, the transmission power is 23 dBm, and λ is 1. When the path gain is from 3 dB to 10 dB, the MCS is 2, the transmission power is 20 dBm, and λ is 0.5. When the path gain is greater than 10 dB, the MCS is 3, the transmission power is 17 dBm, and λ is 0.

Similarly, the configuration 814 indicates constraints for multiple-access signatures to be transmitted in even numbered slots of the slots 720-1 . . . 720-N. The constraint includes transmission parameters and resource allocations, as described supra. Using the UE 704-1 as an example, the UE 704-1 may transmit a multiple-access signature in an even numbered slot when a randomly generated number is greater than λ.

Further, the configuration 814 and the configuration 812 may also include assignments of preambles and DMRSs. For example, each channel profile may also be associated with a set of preambles and/or a set of DMRSs. A UE may only use the preambles and/or the DMRSs associated with the channel profile of the UE when constructing a multiple-access signature.

In this example, the configuration 814 assigns different transmission parameters and λ to different channel profiles. More specifically, when the path gain is less than 3 dB at a UE, the MCS is 1, the transmission power is 23 dBm, and λ is 0. When the path gain is from 3 dB to 10 dB, the MCS is λ, the transmission power is 20 dBm, and λ is 0.5. When the path gain is greater than 10 dB, the MCS is 3, the transmission power is 17 dBm, and λ is 1.

In this example, based on the configuration 812 and the configuration 814, the UEs 704-1, 704-2, 704-3 determines that they each can transmit a multiple-access signature in the slot 720-$k$. Accordingly, the UEs 704-1, 704-2, 704-3 construct, and transmit in the slot 720-$k$, multiple-access signatures 742, 744, 746 according to transmission parameters associated with channel profiles of the UEs 704-1, 704-2, 704-3 as specified by the configuration 812 and the configuration 814.

Further, based on random number generated at the UE 704-G and λ associated with the channel profile of the UE 704-2, the UE 704-G is not allowed to transmit a multiple-access signature in this frame. UE 704-G may wait for the next frame.

FIG. 9 is a diagram 900 illustrating constraints on construction and transmission of multiple-access signatures. In a second technique, the base station 702 transmits configuration including constraints and assignments regarding multiple-access signatures dynamically. The configuration can potentially change in every UL transmission opportunity. A UE listens to the dynamic configuration prior to any attempt of transmission. The UE transmits accordingly subject to constraints and assignments included in the configuration. The base station can also specify behaviors of UEs that fail to decode the configuration. In one example, the dynamic configuration can be signaled in a common part of the downlink control channel. In certain configurations, the dynamic configuration 912 transmitted in the PDCCH 738 may only include partial constraints and assignments for constructing and transmitting a multiple-access signature by a UE, while a configuration transmitted in the PBCH 734 semi-statically may also include partial constraints and assignments.

In this example, the base station 702 transmits a dynamic configuration 912 in a common part of the PDCCH 738 that is to be decoded by all UEs 704-1, 704-2, . . . 704-G. Further, the base station 702 may also transmit an acknowledgement in the PDCCH 738, the acknowledgement acknowledging prior transmissions to the base station 702 from one or more of the UEs 704-1, 704-2, . . . 704-G. The dynamic configuration 912 assigns different preambles and DMRSs to UEs having different channel profiles. As such, each of the UEs 704-1, 704-2, . . . 704-G determines its channel profile, and then select a preamble and/or a DMRS to be included in a multiple-access signature constructed by the UE. Each UE may have been configured with a pool of preambles and/or a pool of DMRSs. The dynamic configuration 912 may indicate indices of the preambles and/or the DMRSs that a UE with a particular channel profile is allowed to use. Based on the indicated indices, the UE can determine the preamble and/or DMRS to use.

More specifically, the channel profile includes a Doppler spread and a delay spread. When the Doppler spread at a UE is low: if the delay spread is low, the UE with such a channel profile can use a preamble and/or a DMRS with an index from 0 to 16 to construct a multiple-access signature; if the delay spread is medium, the UE with such a channel profile can use a preamble and/or a DMRS with an index from 32 to 47 to construct a multiple-access signature. When the Doppler spread at a UE is medium: if the delay spread is low, the UE with such a channel profile can use a preamble and/or a DMRS with an index from 16 to 31 to construct a multiple-access signature; if the delay spread is medium, the UE with such a channel profile can use a preamble and/or a DMRS with an index from 48 to 63 to construct a multiple-access signature. When the delay spread at a UE is high, the UE with such a channel profile cannot transmit a multiple-access signature. When the Doppler spread at a UE is high, the UE with such a channel profile cannot transmit a multiple-access signature.

In this example, each of the UEs 704-1, 704-2, 704-3 may determines its Doppler spread and delay spread. Based on the Doppler spread and the delay spread, when applicable, the UE may select a preamble and a DMRS. As such, the UEs 704-1, 704-2, 704-3 may construct the multiple-access signatures 742, 744, 746, respectively, when none of the UEs 704-1, 704-2, 704-3 has a Doppler spread or a delay spread that is high. Subsequently, the UEs 704-1, 704-2, 704-3 may transmit such multiple-access signatures 742, 744, 746 in the slot 720-$k$.

Figure 10:
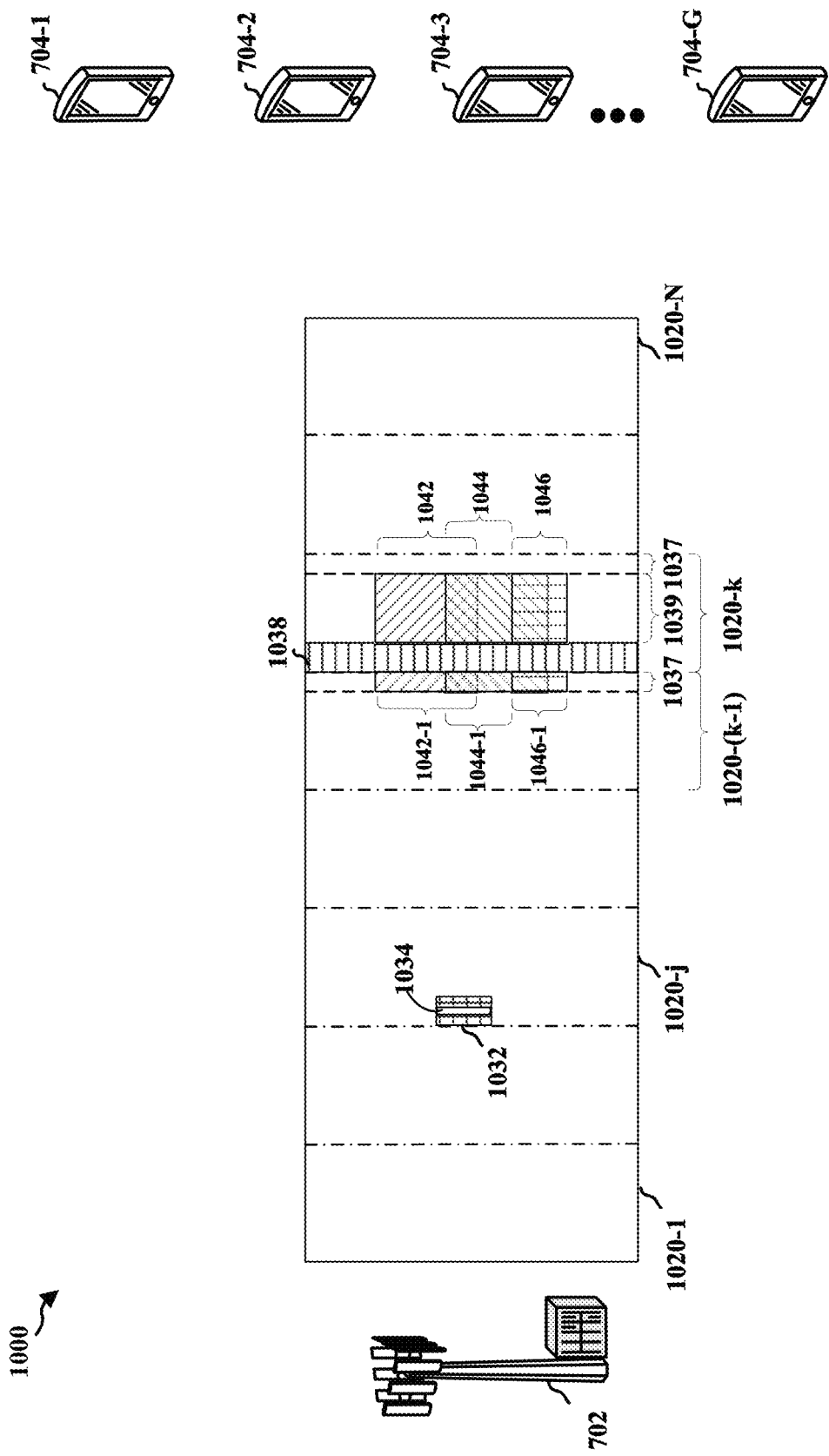
FIG. 10 is a diagram illustrating communications between a UE and multiple UEs.

FIG. 10 is a diagram 1000 illustrating communications between the UE 704-1 and the UEs 704-1, 704-2, . . . 704-G. Similar to what was described supra referring to FIG. 7, the base station 702 transmits signals in slots 1020-1 . . . 1020-N. The base station 702 transmits an SSB 1032 in a slot 1020-$j$. Each of the slots 1020-1 . . . 1020-N may include a PDCCH 1038. Further, each of the slots 1020-1 . . . 1020-N may include a time period 1037.

In this technique, the UEs 704-1, 704-2, . . . 704-G each may autonomously transmit to the base station 702 a first part of a multiple-access signature, the first part including an identifier identifying the UE 704-1. For example, the base station 702 and the UEs 704-1, 704-2, . . . 704-G are configured with a pool of preambles with indices. A UE may transmit a selected preamble to the base station 702, and that preamble and/or the preamble's index can be used by the base station 702 to identify the UE.

In this example, the UEs 704-1, 704-2, 704-3 autonomously transmits multiple-access signature parts 1042-1, 1044-1, 1046-1, respectively, to the base station 702 in the time period 1037 of the slot 1020-($k$–1). Each of the multiple-access signature parts 1042-1, 1044-1, 1046-1 includes a preamble randomly selected by the corresponding UE from the pool of preambles. For example, the indices of the preambles included in the multiple-access signature parts 1042-1, 1044-1, 1046-1 may be 13, 25, and 38, respectively. In another example, those preambles may be pre-assigned to the UEs 704-1, 704-2, 704-3. Further, the multiple-access signature parts 1042-1, 1044-1, 1046-1 may carry UE specific information, such as transmission resource allocation.

The base station 702 receives the multiple-access signature parts 1042-1, 1044-1, 1046-1 (i.e., preambles in this example), along with preambles sent by other UEs. The base station 702 utilizes information gathered from the preambles from the UEs to determine constraints and assignments that may maximize efficiency and performance of the subsequent transmissions of the remaining parts of multiple-access signatures.

For example, based on estimations of the channel's delay-Doppler spread from the preambles (or other identification signature signals) received from the one or more of the UEs 704-1, 704-2, . . . 704-G, the base station 702 can select a reduced set of UEs and assign to the set of UEs DMRSs that can minimize the interference among DMRSs from different UEs. In particular, the base station 702 may assign to the set UEs DMRSs that are orthogonal to each other. As such, the base station 702 instructs only a reduced number of UEs to transmit the remaining parts of the multiple-access signatures, thus reducing interference.

Further, among the UEs whose identification signature signals (e.g., preambles) are successfully detected by the base station 702 and that are selected by the base station 702, the base station 702 may transmit configuration that include indication of which UEs can transmit the remaining parts of the multiple-access signatures in the subsequent transmission opportunity and at what MCS level and transmit power in order to maximize throughput.

The base station transmits a configuration to the UEs 704-1, 704-2, . . . 704-G in the PDCCH 1038. The configuration indicates that certain UEs may transmit the remaining parts of the multiple-access signatures based on certain assignments of DMRSs and certain constraints on transmission parameters. Further, the base station 702 may also transmit an acknowledgement in the PDCCH 1038, the acknowledgement acknowledging prior transmissions to the base station 702 from one or more of the UEs 704-1, 704-2, . . . 704-G.

In certain configurations, the UEs 704-1, 704-2, . . . 704-G may receive a configuration in the PBCH 1034. As described supra referring to FIG. 7, the configuration in the PBCH 1034 may include constraints and assignments corresponding to channel profile. Each of the UEs 704-1, 704-2, 704-3 may transmit the preamble according to the transmission parameters and assignments corresponding to the channel profile of that UE. As such, the UEs 704-1, 704-2, 704-3 may transit the multiple-access signature parts 1042-1, 1044-1, 1046-1 accordingly.

FIG. 11 is a diagram 1100 illustrating constraints on construction and transmission of multiple-access signatures. In the example described supra referring to FIG. 10, the base station 702 transmit a dynamic configuration 1112 in the PDCCH 1038 of the slot 1020-k, in response to the preambles received in the time period 1037 of the slot 1020-(k−1). The dynamic configuration 1112 includes indications of the limited preambles selected by the base station 702 from all preambles received at the time period 1037 of the slot 1020-(k−1). In this example, the dynamic configuration 1112 indicates preambles with indices 1, 13, 25, 38, 73 are selected. The UEs that sent the selected preambles may transmit the remaining part of the multiple-access signature in the slot 1020-k. Other UEs may not transmit their remaining parts of the multiple-access signatures in the slot 1020-k.

Further, each of the selected preamble in the dynamic configuration 1112 are associated with, among other things, assignment of DMRSs and constraints of transmission parameters. In this example, for each selected preamble, the dynamic configuration 1112 specifies an index of a DMRS, an index of a scrambler and/or interleaver, an MCS level, and a transmission power.

The UEs 704-1, 704-2, 704-3 receives the dynamic configuration 1112 in the PDCCH 1038 of the slot 1020-k. The UEs 704-1, 704-2, 704-3 determine that the preambles sent in the multiple-access signature parts 1042-1, 1044-1, 1046-1 are indicated in the dynamic configuration 1112, respectively. Accordingly, the UEs 704-1, 704-2, 704-3 determines that they can transmit the remaining parts of the multiple-access signatures in a time period 1039 of the slot 1020-k that is between the PDCCH 1038 and the time period 1037.

The UEs 704-1, 704-2, 704-3 generates and transmits multiple-access signature parts 1042-2, 1044-2, 1046-2, respectively. Each of the multiple-access signature parts 1042-2, 1044-2, 1046-2 is constructed and transmitted in accordance with the DMRS assignment and transmission parameter constraints as specified in the dynamic configuration 1112. In this example, the UE 704-1, corresponding to preamble index 13, constructs the multiple-access signature part 1042-2 to include DMRS with an index 2. The data bits are interleaved by an interleaver with an index 2 and/or scrambled by a scrambler with an index 2. The data bits are encoded and modulated in accordance with an MCS level 3. The multiple-access signature part 1042-2 is transmitted at a transmission power configuration with an index 1.

Further, in certain configurations, some of the transmission parameters (or multiple-access signature components) can be pre-configured and associated with a preamble or specified a priori by a mapping to a preamble to reduce configuration table size and, thus, signaling overhead. For example, a particular scrambler/interleaver can be mapped to each of the preamble in the pool. Once the preamble is selected, the corresponding scrambler/interleaver is also determined. In these configurations, the dynamic configuration 1112 does not include the indication of indices of the scramblers/interleavers.

Subsequently, the UEs 704-1, 704-2, . . . 704-G may select and transmit preambles again in the time period 1037 of the slot 1020-k.

Figure 12:
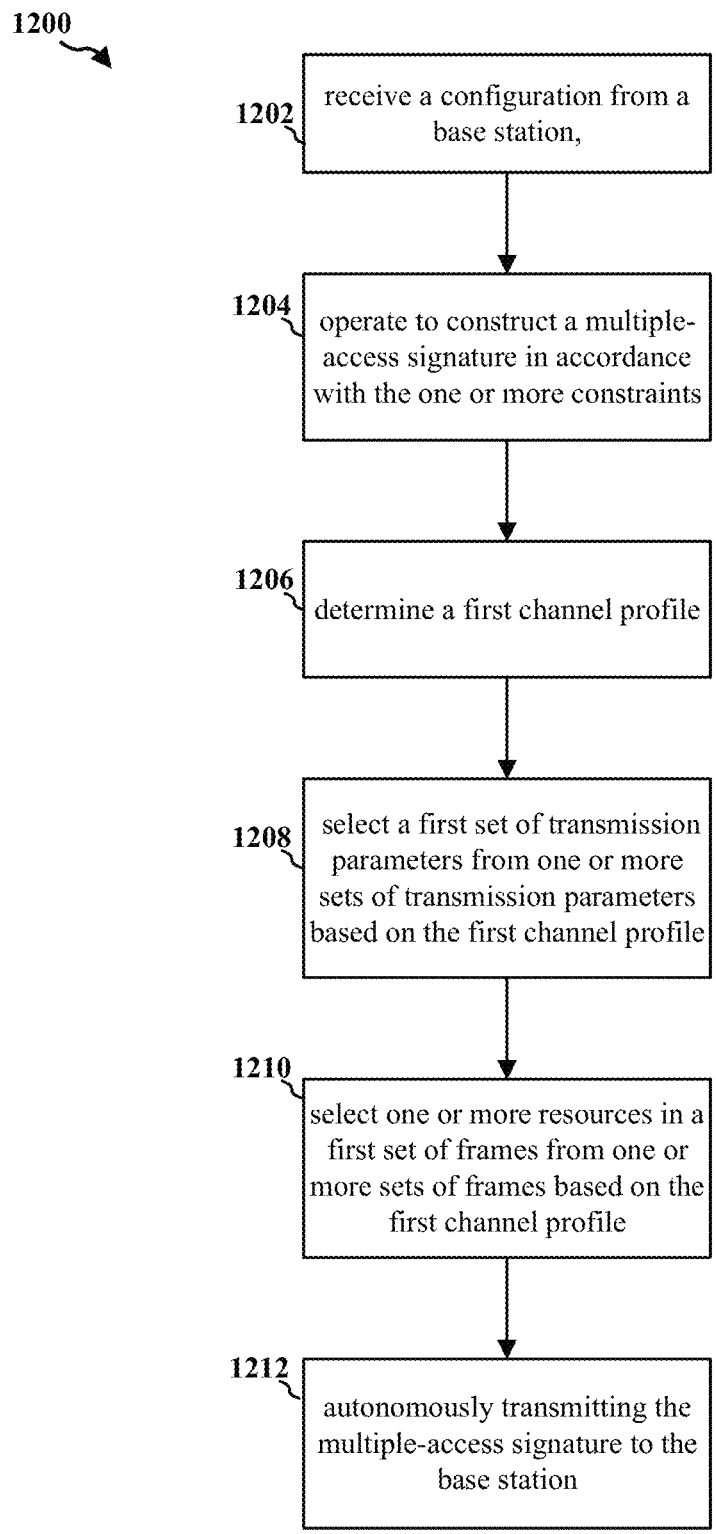
FIG. 12 is a flow chart of a method (process) for for transmitting multiple-access signatures.

FIG. 12 is a flow chart 1200 of a method (process) for transmitting multiple-access signatures. The method may be performed by a UE (e.g., the UEs 704-1, 704-2, . . . 704-G, the apparatus 1502, and the apparatus 1502').

At operation 1202, the UE receives a configuration (e.g., the configuration 812, the configuration 814) from a base station (e.g., the base station 702). The configuration indicates one or more constraints for constructing and transmitting a multiple-access signature (e.g., any of the multiple-access signatures 742, 744, 746). In certain configurations, the configuration is received in a broadcast channel (e.g., the PBCH 734) semi-statically. In certain configurations, the one or more constraints include one or more sets of transmission parameters corresponding to one or more channel profiles. In certain configurations, a set of transmission parameters include indications of an MCS and a transmit power. In certain configurations, each of the one or more channel profiles includes a path gain.

At operation 1204, the UE operates to construct the multiple-access signature in accordance with the one or more constraints. More specifically, the UE, at operation 1206, determines a first channel profile of the UE (e.g., path gain is 3 dB).

At operation 1208, the UE selects a first set of transmission parameters from one or more sets of transmission parameters based on the first channel profile. In certain configurations, the one or more constraints include an allocation of resources for transmitting the multiple-access signature. At operation 1210, the UE selects one or more resources in a first set of frames from one or more sets of frames (e.g., odd numbered frames or even numbered frames) based on the first channel profile. At operation 1212, the UE autonomously transmits the multiple-access signature to the base station in accordance with the first set of transmission parameters in the one or more resources.

Figure 13:
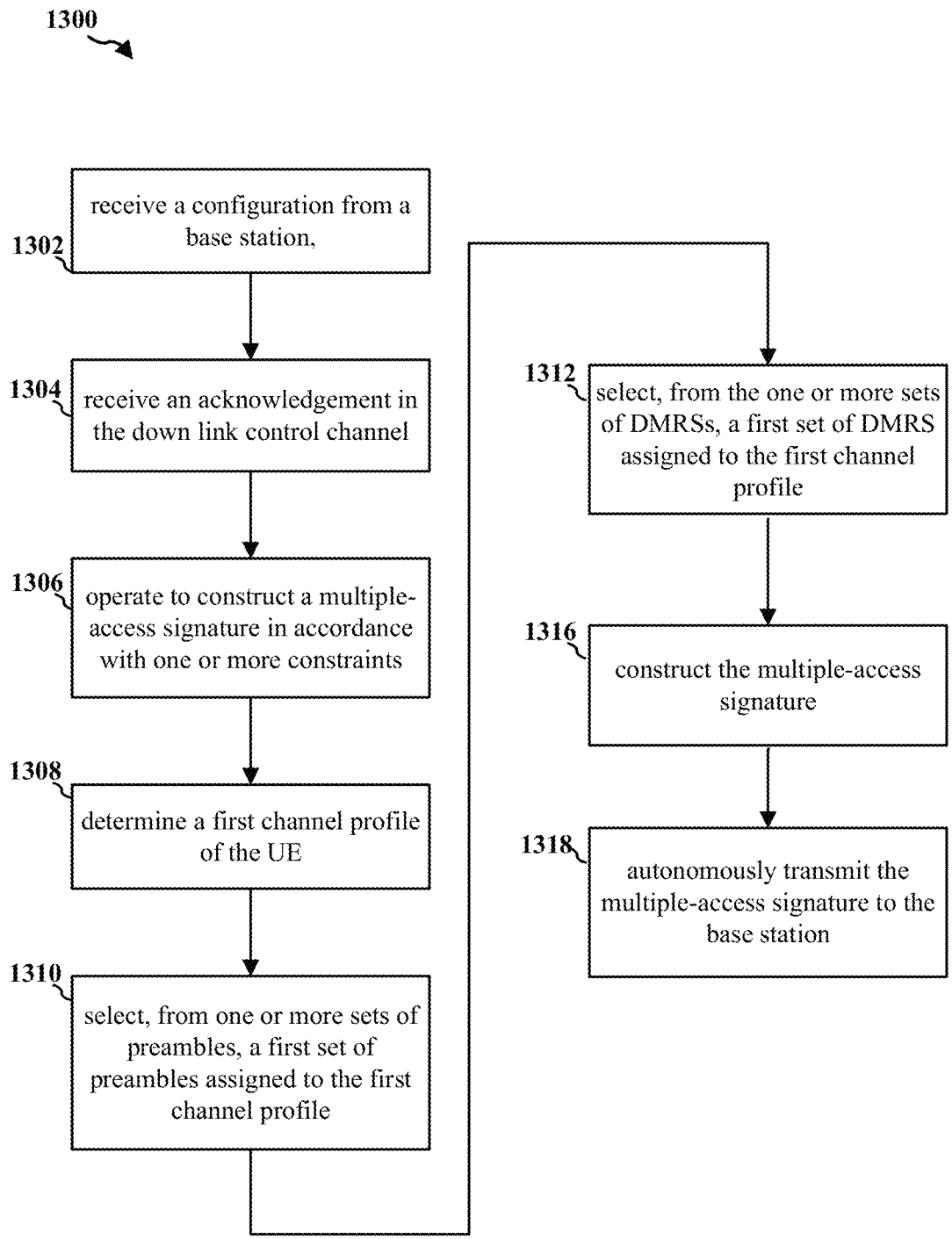
FIG. 13 is a flow chart of a method (process) for for transmitting multiple-access signatures.

FIG. 13 is a flow chart 1300 of a method (process) for transmitting multiple-access signatures. The method may be performed by a UE (e.g., the UEs 704-1, 704-2, . . . 704-G, the apparatus 1502, and the apparatus 1502'). At operation 1302, the UE receives a configuration (e.g., the dynamic configuration 912) from a base station. The configuration indicates one or more constraints for constructing and transmitting a multiple-access signature. In certain configurations, at least a first part of the configuration is received in a down link control channel (e.g., the PDCCH 738) dynamically. In certain configurations, an entirety of the configuration is received in the down link control channel. In certain configurations, a second part of the configuration is received in a broadcast channel (e.g., the PBCH 734) semi-statically.

In certain configurations, the UE may, at operation 1304, receive an acknowledgement in the down link control channel. The acknowledgement acknowledges prior transmissions to the base station from one or more UEs. At operation 1306, the UE operates to construct the multiple-access signature in accordance with the one or more constraints.

At operation 1308, the UE determines a first channel profile (e.g., the Doppler spread is low and the delay spread is medium) of the UE. In certain configurations, each of the one or more channel profiles includes at least one of a Doppler spread and delay spread. In certain configurations, the configuration further includes assignment of one or more sets of preambles to one or more channel profiles, respectively. At operation 1310, the UE selects, from the one or more sets of preambles, a first set of preambles assigned to the first channel profile. In certain configurations, the configuration further includes assignment of one or more sets of DMRSs to one or more channel profiles, respectively. At operation 1312, the UE selects, from the one or more sets of DMRSs, a first set of DMRS assigned to the first channel profile.

At operation 1316, the UE constructs the multiple-access signature (e.g., any of the multiple-access signatures 742, 744, 746) to include a preamble from the first set of preambles and/or a DMRS from the first set of DMRSs. At operation 1318, the UE autonomously transmits the multiple-access signature to the base station.

Figure 14:
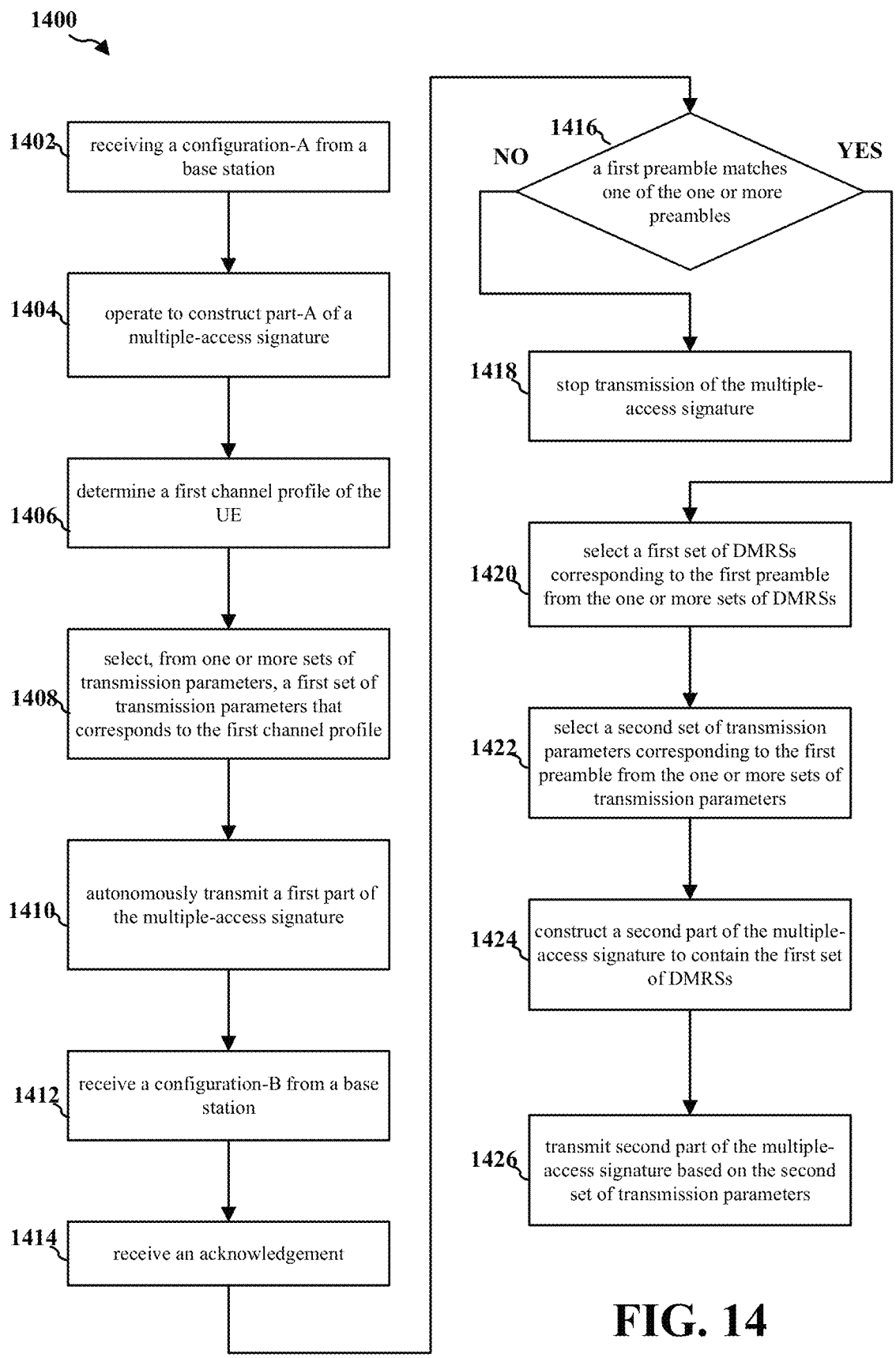
FIG. 14 is a flow chart of a method (process) for for transmitting multiple-access signatures.

FIG. 14 is a flow chart 1400 of a method (process) for transmitting multiple-access signatures. The method may be performed by a UE (e.g., the UEs 704-1, 704-2, . . . 704-G, the apparatus 1502, and the apparatus 1502'). At operation 1402, the UE receiving a configuration-A (e.g., a configuration in the PBCH 1034) from a base station. The configuration-A indicates one or more constraints for constructing and transmitting a part-A of a multiple-access signature (e.g., any of the multiple-access signature parts 1042-1, 1044-1, 1046-1). In certain configurations, the configuration-A is received in a broadcast channel semi-statically. At operation 1404, the UE operates to construct the part-A of the multiple-access signature in accordance with the one or more constraints.

In certain configurations, the one or more constraints in the configuration-A include one or more sets of transmission parameters (e.g., MCS and transmission power) corresponding to one or more channel profiles. At operation 1406, the UE determines a first channel profile (e.g., path gain is 3 dB) of the UE. At operation 1408, the UE selects, from the one or more sets of transmission parameters, a first set of transmission parameters that corresponds to the first channel profile. At operation 1410, the UE autonomously transmits the part-A of the multiple-access signature in accordance with the first set of transmission parameters. The part-A of the multiple-access signature includes a preamble.

At operation 1412, the UE receives a configuration-B (e.g., the dynamic configuration 1112) from the base station. In certain configurations, the configuration-B is received in a down link control channel (e.g., the PDCCH 1038) dynamically. At operation 1414, the UE receives an acknowledgement in the down link control channel, the acknowledgement acknowledging prior transmissions to the base station from one or more UEs.

In certain configurations, the configuration-B includes assignment of one or more sets of DMRSs to one or more UEs corresponding to one or more preambles (e.g., the preambles in the dynamic configuration 1112). At operation 1416, the UE determines whether a first preamble (e.g., the preamble with index 25) associated with the UE matches one of the one or more preambles.

When the first preamble does not match the one of the one or more preambles, at operation 1418, the UE stops transmission of the multiple-access signature.

When the first preamble matches the one of the one or more preambles. At operation 1420, the UE selects a first set of DMRSs corresponding to the first preamble from the one or more sets of DMRSs. In certain configurations, the configuration-B includes one or more sets of transmission parameters (e.g., the scrambler/interleaver, MCS level, transmission power) corresponding to one or more preambles. At operation 1422, the UE selects a second set of transmission parameters corresponding to the first preamble from the one or more sets of transmission parameters.

At operation 1424, the UE constructs a part-B (e.g., any of the multiple-access signature parts 1042-2, 1044-2, 1046-2) of the multiple-access signature to contain the first set of DMRSs. At operation 1426, the UE transmits the part-B of the multiple-access signature based on the second set of transmission parameters.

In certain configurations, the second set of transmission parameters includes at least one of an MCS and a transmit power. In certain configurations, the second set of transmission parameters further includes at least one of an indication of a scrambler and an indication of an interleaver. In certain configurations, the UE selects a scrambler or an interleaver based on an association between the first preamble and the scrambler or the interleaver. The multiple-access signature is constructed by using the selected scrambler or an interleaver.

Figure 15:
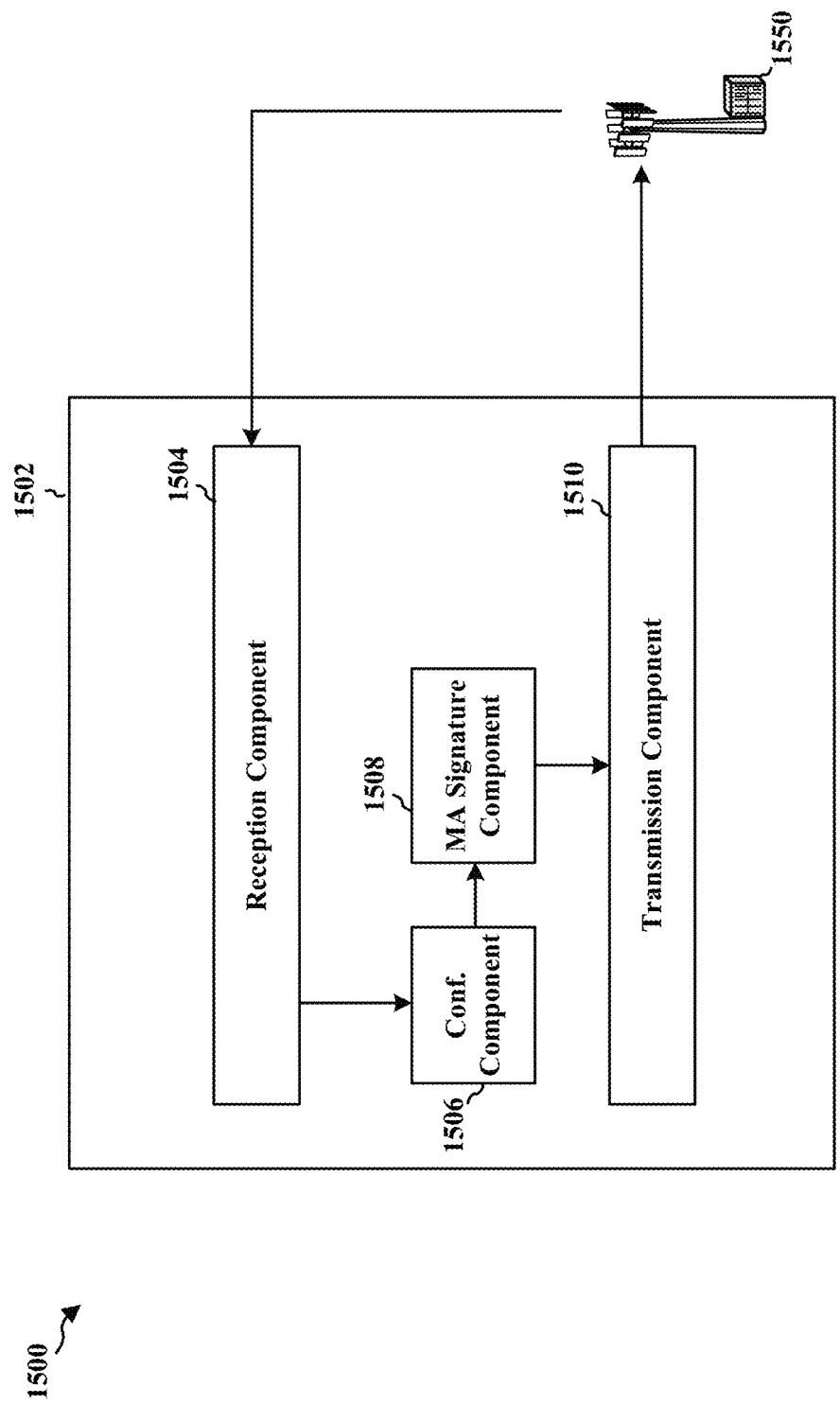
FIG. 15 is a conceptual data flow diagram illustrating the data flow between different components/means in an exemplary apparatus.

FIG. 15 is a conceptual data flow diagram 1500 illustrating the data flow between different components/means in an exemplary apparatus 1502. The apparatus 1502 may be a UE. The apparatus 1502 includes a reception component 1504, a configuration component 1506, a multiple-access signature component 1508, and a transmission component 1510.

In a first implementation, the reception component 1504/configuration component 1506 receives a configuration (e.g., the configuration 812, the configuration 814) from a base station 1550 (e.g., the base station 702). The configuration indicates one or more constraints for constructing and transmitting a multiple-access signature (e.g., any of the multiple-access signatures 742, 744, 746). In certain configurations, the configuration is received in a broadcast channel (e.g., the PBCH 734) semi-statically. In certain configurations, the one or more constraints include one or more sets of transmission parameters corresponding to one or more channel profiles. In certain configurations, a set of transmission parameters include indications of an MCS and a transmit power. In certain configurations, each of the one or more channel profiles includes a path gain.

The multiple-access signature component 1508 operates to construct the multiple-access signature in accordance with the one or more constraints. More specifically, the multiple-access signature component 1508 determines a first channel profile of the configuration component 1506/multiple-access signature component 1508 (e.g., path gain is 3 dB).

The multiple-access signature component 1508 selects a first set of transmission parameters from one or more sets of transmission parameters based on the first channel profile. In certain configurations, the one or more constraints include an allocation of resources for transmitting the multiple-access signature. The multiple-access signature component 1508 selects one or more resources in a first set of frames from one or more sets of frames (e.g., odd numbered frames or even numbered frames) based on the first channel profile. The multiple-access signature component 1508/transmission component 1510 autonomously transmits the multiple-access signature to the base station 1550 in accordance with the first set of transmission parameters in the one or more resources.

In a second implementation, the reception component 1504/configuration component 1506 receives a configuration (e.g., the dynamic configuration 912) from a base station 1550. The configuration indicates one or more constraints for constructing and transmitting a multiple-access signature. In certain configurations, at least a first part of the configuration is received in a down link control channel (e.g., the PDCCH 738) dynamically. In certain configurations, an entirety of the configuration is received in the down link control channel. In certain configurations, a second part of the configuration is received in a broadcast channel (e.g., the PBCH 734) semi-statically.

In certain configurations, the reception component 1504 may receive an acknowledgement in the down link control channel. The acknowledgement acknowledges prior transmissions to the base station 1550 from one or more UEs. The multiple-access signature component 1508 operates to construct the multiple-access signature in accordance with the one or more constraints.

The multiple-access signature component 1508 determines a first channel profile (e.g., the Doppler spread is low and the delay spread is medium) of the configuration component 1506/multiple-access signature component 1508. In certain configurations, each of the one or more channel profiles includes at least one of a Doppler spread and delay spread. In certain configurations, the configuration further includes assignment of one or more sets of preambles to one or more channel profiles, respectively. The multiple-access signature component 1508 selects, from the one or more sets of preambles, a first set of preambles assigned to the first channel profile. In certain configurations, the configuration further includes assignment of one or more sets of DMRSs to one or more channel profiles, respectively. The multiple-access signature component 1508 selects, from the one or more sets of DMRSs, a first set of DMRS assigned to the first channel profile.

The multiple-access signature component 1508 constructs the multiple-access signature (e.g., any of the multiple-access signatures 742, 744, 746) to include a preamble from the first set of preambles and/or a DMRS from the first set of DMRSs. The multiple-access signature component 1508/transmission component 1510 autonomously transmits the multiple-access signature to the base station 1550.

In a third implementation, the reception component 1504/configuration component 1506 receives a configuration-A (e.g., a configuration in the PBCH 1034) from a base station 1550. The configuration-A indicates one or more constraints for constructing and transmitting a part-A of a multiple-access signature (e.g., any of the multiple-access signature parts 1042-1, 1044-1, 1046-1). In certain configurations, the configuration-A is received in a broadcast channel semi-statically. The multiple-access signature component 1508 operates to construct the part-A of the multiple-access signature in accordance with the one or more constraints.

In certain configurations, the one or more constraints in the configuration-A include one or more sets of transmission parameters (e.g., MCS and transmission power) corresponding to one or more channel profiles. The multiple-access signature component 1508 determines a first channel profile (e.g., path gain is 3 dB) of the configuration component 1506/multiple-access signature component 1508. The multiple-access signature component 1508 selects, from the one or more sets of transmission parameters, a first set of transmission parameters that corresponds to the first channel profile. The multiple-access signature component 1508/transmission component 1510 autonomously transmits the part-A of the multiple-access signature in accordance with the first set of transmission parameters. The part-A of the multiple-access signature includes a preamble.

The reception component 1504/configuration component 1506 receives a configuration-B (e.g., the dynamic configuration 1112) from the base station 1550. In certain configurations, the configuration-B is received in a down link control channel (e.g., the PDCCH 1038) dynamically. The reception component 1504 receives an acknowledgement in the down link control channel, the acknowledgement acknowledging prior transmissions to the base station 1550 from one or more UEs.

In certain configurations, the configuration-B includes assignment of one or more sets of DMRSs to one or more UEs corresponding to one or more preambles (e.g., the preambles in the dynamic configuration 1112). The multiple-access signature component 1508 determines whether a first preamble (e.g., the preamble with index 25) associated with the UE matches one of the one or more preambles.

When the first preamble does not match the one of the one or more preambles, the multiple-access signature component 1508 stops transmission of the multiple-access signature.

When the first preamble matches the one of the one or more preambles. The multiple-access signature component 1508 selects a first set of DMRSs corresponding to the first preamble from the one or more sets of DMRSs. In certain configurations, the configuration-B includes one or more sets of transmission parameters (e.g., the scrambler/interleaver, MCS level, transmission power) corresponding to one or more preambles. The multiple-access signature component 1508 selects a second set of transmission parameters corresponding to the first preamble from the one or more sets of transmission parameters.

The multiple-access signature component 1508 constructs a part-B (e.g., any of the multiple-access signature parts 1042-2, 1044-2, 1046-2) of the multiple-access signature to contain the first set of DMRSs. The multiple-access signature component 1508/transmission component 1510 transmits the part-B of the multiple-access signature based on the second set of transmission parameters.

In certain configurations, the second set of transmission parameters includes at least one of an MCS and a transmit power. In certain configurations, the second set of transmission parameters further includes at least one of an indication of a scrambler and an indication of an interleaver. In certain configurations, the multiple-access signature component 1508 selects a scrambler or an interleaver based on an association between the first preamble and the scrambler or the interleaver. The multiple-access signature is constructed by using the selected scrambler or an interleaver.

Figure 16:
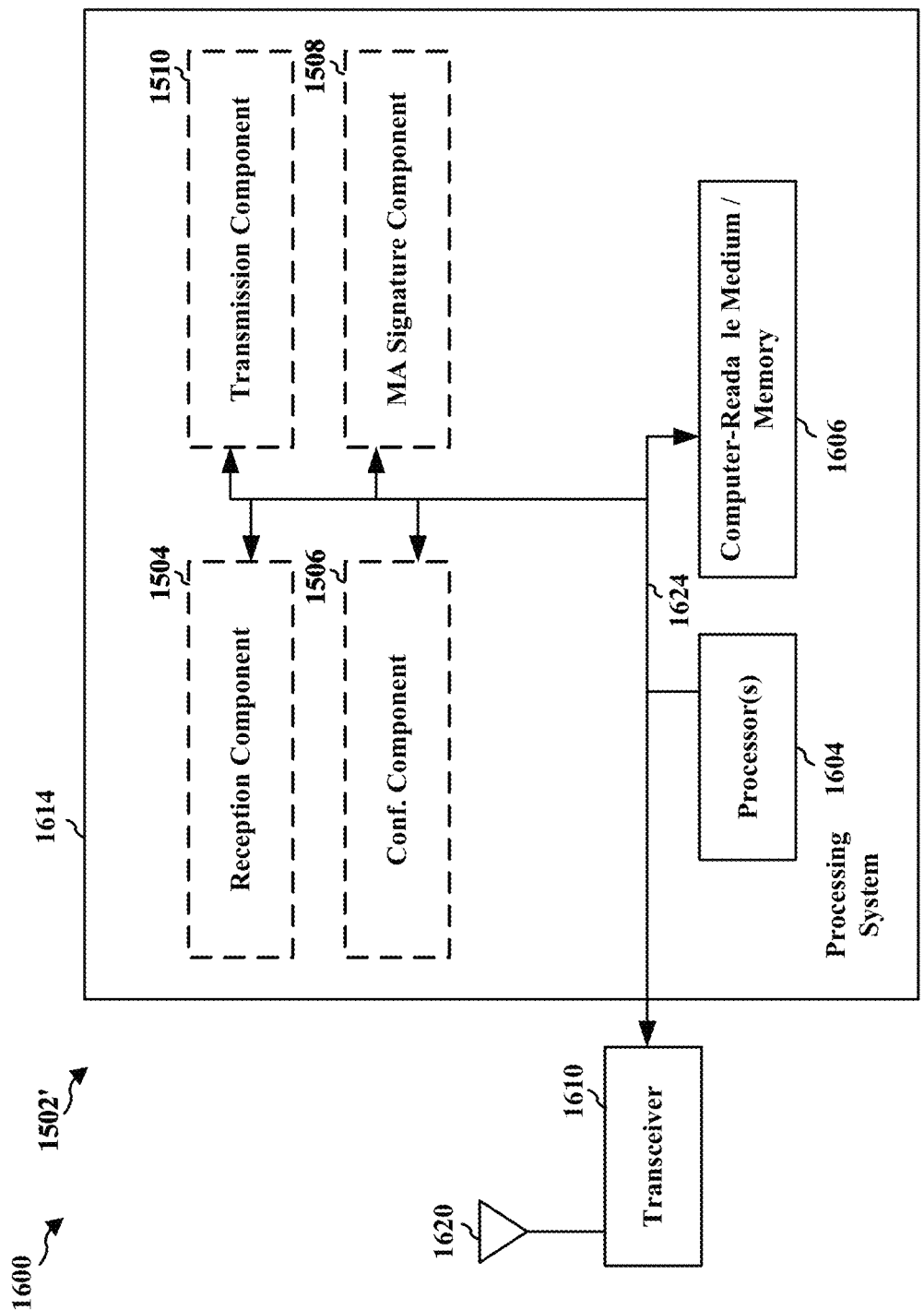
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The apparatus 1502' may be a UE. The processing system 1614 may be implemented with a bus architecture, represented generally by a bus 1624. The bus 1624 may include any number of interconnecting buses and bridges depending on the specific application of the processing system 1614 and the overall design constraints. The bus 1624 links together various circuits including one or more processors and/or hardware components, represented by one or more processors 1604, the reception component 1504, the transmission component 1510, the configuration component 1506, the multiple-access signature component 1508, and a computer-readable medium/memory 1606. The bus 1624 may also link various other circuits such as timing sources, peripherals, voltage regulators, and power management circuits, etc.

The processing system 1614 may be coupled to a transceiver 1610, which may be one or more of the transceivers 254. The transceiver 1610 is coupled to one or more antennas 1620, which may be the communication antennas 252.

The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620.

The processing system 1614 includes one or more processors 1604 coupled to a computer-readable medium/memory 1606. The one or more processors 1604 are responsible for general processing, including the execution of software stored on the computer-readable medium/memory 1606. The software, when executed by the one or more processors 1604, causes the processing system 1614 to perform the various functions described supra for any particular apparatus. The computer-readable medium/memory 1606 may also be used for storing data that is manipulated by the one or more processors 1604 when executing software. The processing system 1614 further includes at least one of a reception component 1504, a transmission component 1510, a configuration component 1506, and a multiple-access signature component 1508. The components may be software components running in the one or more processors 1604, resident/stored in the computer readable medium/memory 1606, one or more hardware components coupled to the one or more processors 1604, or some combination thereof. The processing system 1614 may be a component of the UE 250 and may include the memory 260 and/or at least one of the TX processor 268, the RX processor 256, and the communication processor 259.

In one configuration, the apparatus 1502/apparatus 1502' for wireless communication includes means for performing each of the operations of FIGS. 12-14. The aforementioned means may be one or more of the aforementioned components of the apparatus 1502 and/or the processing system 1614 of the apparatus 1502' configured to perform the functions recited by the aforementioned means.

As described supra, the processing system 1614 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving a configuration from a base station, the configuration indicating one or more constraints for constructing and transmitting a multiple-access signature, wherein at least a first part of the configuration is received in a down link control channel dynamically;
    constructing the multiple-access signature in accordance with the one or more constraints; and
    autonomously transmitting the multiple-access signature to the base station in accordance with the one or more constraints, including: transmitting a first part of the multiple-access signature prior to receiving the at least the first part of the configuration in the down link control channel and transmitting a second part of the multiple-access signature subsequent to receiving the at least the first part of the configuration in the down link control channel, the first part of the multiple-access signature including a first preamble that identifies the multiple-access signature.

2. The method of claim 1, wherein a second part of the configuration is received in a broadcast channel semi-statically.

3. The method of claim 2, wherein the one or more constraints include a first set of transmission parameters and an allocation of resources for transmitting the multiple-access signature, the method further comprising:
    selecting one or more resources based on the allocation of resources, wherein the multiple-access signature is constructed and transmitted based on the first set of transmission parameters, wherein the multiple-access signature is further transmitted in the one or more resources.

4. The method of claim 3, wherein the first set of transmission parameters include indications of a modulation and coding scheme (MCS) and a transmit power.

5. The method of claim 3, wherein the one or more constraints include one or more sets of transmission parameters corresponding to one or more channel profiles, wherein the one or more sets of transmission parameters include the first set of transmission parameters, the method further comprising:
    determining a first channel profile of the UE, wherein the first set of transmission parameters is selected from the one or more sets of transmission parameters and corresponds to the first channel profile.

6. The method of claim 5, wherein each of the one or more channel profiles includes a path gain.

7. The method of claim 3, wherein the allocation of resources includes indications of one or more sets of frames corresponding to one or more channel profiles, the method further comprising:
    determining a first channel profile of the UE, wherein the one or more resources are in a first set of frames that is selected from the one or more sets of frames and that corresponds to the first channel profile.

8. The method of claim 1, wherein an entirety of the configuration is received in the down link control channel.

9. The method of claim 2, wherein the one or more constraints in the second part of the configuration include one or more sets of transmission parameters corresponding to one or more channel profiles, the method further comprising:
    determining a first channel profile of the UE; and
    selecting, from the one or more sets of transmission parameters, a first set of transmission parameters that corresponds to the first channel profile, wherein the autonomously transmitting the multiple-access signature includes transmitting a preamble of the multiple-access signature in accordance with the first set of transmission parameters prior to receiving the at least the first part of the configuration in the down link control channel.

10. The method of claim 1, further comprising: receiving an acknowledgement in the down link control channel, the acknowledgement acknowledging prior transmissions to the base station from one or more UEs.

11. The method of claim 1, wherein the configuration further includes assignment of one or more sets of preambles to one or more channel profiles, respectively, the method further comprising:
    determining a first channel profile of the UE; and
    selecting, from the one or more sets of preambles, a first set of preambles assigned to the first channel profile, wherein the multiple-access signature is further constructed to include a preamble from the first set of preambles.

12. The method of claim 11, wherein each of the one or more channel profiles includes at least one of a Doppler spread and delay spread.

13. The method of claim 1, wherein the configuration further includes assignment of one or more sets of Demodulation Reference Signals (DMRSs) to one or more channel profiles, respectively, the method further comprising:
    determining a first channel profile of the UE; and
    selecting, from the one or more sets of DMRSs, a first set of DMRS assigned to the first channel profile, wherein the multiple-access signature is further constructed to include a DMRS from the first set of DMRSs.

14. The method of claim 1, wherein the at least the first part of the configuration further includes assignment of one or more sets of Demodulation Reference Signals (DMRSs) to one or more UEs corresponding to one or more preambles, the method further comprising:
    determining whether the first preamble matches one of the one or more preambles; and
    selecting a first set of DMRSs corresponding to the first preamble from the one or more sets of DMRSs, when the first preamble matches one of the one or more preambles, wherein the second part of the multiple-access signature is further constructed to contain the first set of DMRSs.

15. The method of claim 1, wherein the one or more constraints in the at least the first part of the configuration include one or more sets of transmission parameters corresponding to one or more preambles, the method further comprising:
    determining whether the first preamble matches one of the one or more preambles; and
    selecting a first set of transmission parameters corresponding to the first preamble from the one or more sets of transmission parameters, when the first preamble matches one of the one or more preambles, wherein the second part of the multiple-access signature is constructed and transmitted based on the first set of transmission parameters.

16. The method of claim 15, wherein the first set of transmission parameters includes at least one of
    a modulation and coding scheme (MCS); and
    a transmit power.

17. The method of claim 16, wherein the first set of transmission parameters further includes at least one of
an indication of a scrambler; and
an indication of an interleaver.

18. The method of claim 16, further comprising:
selecting a scrambler or an interleaver based on an association between the first preamble and the scrambler or the interleaver, wherein the multiple-access signature is constructed by using the selected scrambler or an interleaver.

19. An apparatus for wireless communication, comprising:
a memory; and
at least one processor coupled to the memory and configured to:
receive a configuration from a base station, the configuration indicating one or more constraints for constructing and transmitting a multiple-access signature, wherein at least a first part of the configuration is received in a down link control channel dynamically;
construct the multiple-access signature in accordance with the one or more constraints; and
autonomously transmit the multiple-access signature to the base station in accordance with the one or more constraints, wherein the at least one processor is further configured to: transmit a first part of the multiple-access signature prior to receiving the at least the first part of the configuration in the down link control channel and transmit a second part of the multiple-access signature subsequent to receiving the at least the first part of the configuration in the down link control channel, the first part of the multiple-access signature including a first preamble that identifies the multiple-access signature.

20. A non-transitory computer-readable medium storing computer executable code for wireless communication of wireless equipment, comprising code to:
receive a configuration from a base station, the configuration indicating one or more constraints for constructing and transmitting a multiple-access signature, wherein at least a first part of the configuration is received in a down link control channel dynamically;
construct the multiple-access signature in accordance with the one or more constraints; and
autonomously transmit the multiple-access signature to the base station in accordance with the one or more constraints, wherein the code is further configured to: transmit a first part of the multiple-access signature prior to receiving the at least the first part of the configuration in the down link control channel and transmit a second part of the multiple-access signature subsequent to receiving the at least the first part of the configuration in the down link control channel, the first part of the multiple-access signature including a first preamble that identifies the multiple-access signature.

* * * * *